Aug. 7, 1928.
H. J. MURPHY
1,679,538
LUBRICATING APPARATUS
Filed Jan. 9, 1926
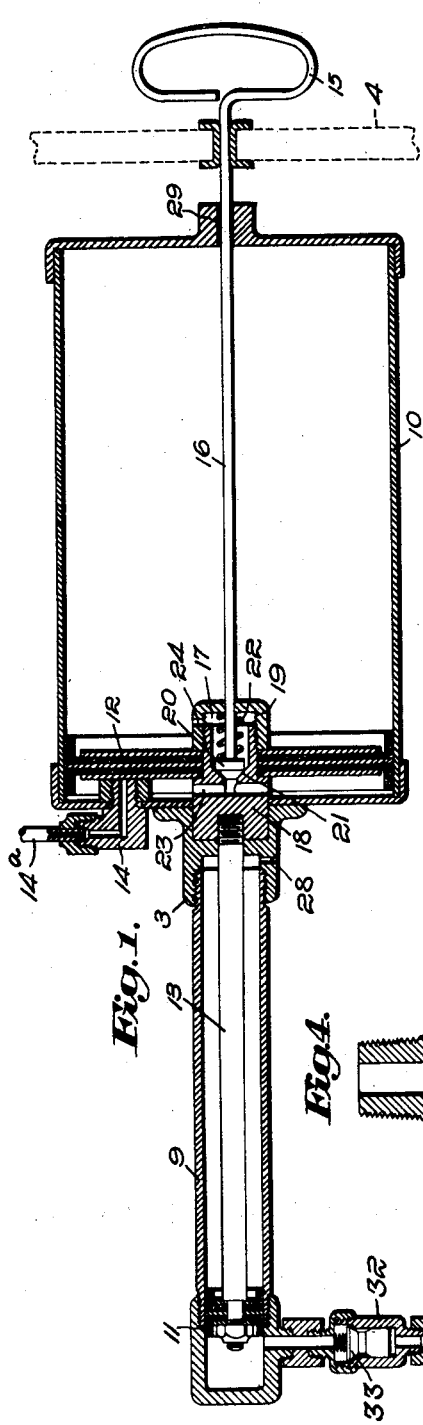
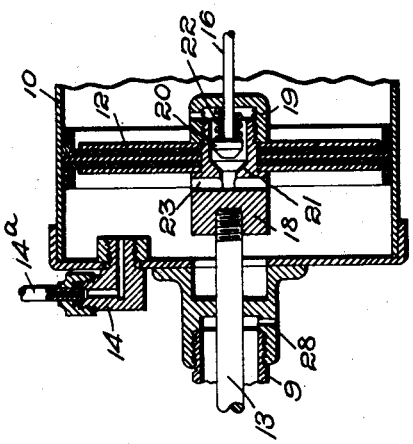
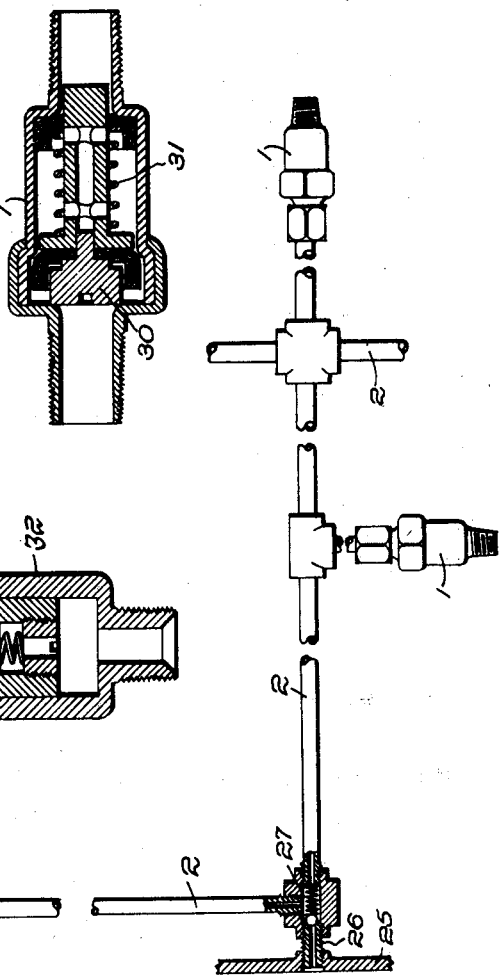
Inventor:
Howard J. Murphy,
by Emery Booth Janney Varney
Attys Patented Aug. 7, 1928.

1,679,538

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed January 9, 1926. Serial No. 80,248.

This invention aims to provide improvements in lubricating apparatus.

In the drawings, which illustrate a preferred embodiment of my invention:—

Figure 1 illustrates a portion of a central lubricating system showing some of the parts thereof in cross-section;

Fig. 2 is a section of a portion of the vacuum operated pump showing the position of the parts associated therewith when the piston is being urged in one direction by manual operation;

Fig. 3 is a longitudinal section of one of the lubricant measuring devices; and

Fig. 4 is an enlarged section of the two-way valve device shown in Fig. 1.

Referring to the drawings, I have illustrated a central lubricating system which is particularly, though not exclusively, adapted for use as a simple and effective apparatus for lubricating various parts of a motor vehicle.

The system illustrated includes a plurality of charge-determining devices or lubricant cups 1, preferably located at or adjacent to a part to be lubricated. All the cups are connected by a pipe system 2, through which the lubricant may be forced. A pump 3 is preferably located at the back of the dash 4 (shown in dotted lines in Fig. 1) and is used for forcing lubricant under pressure through the pipe system 2 to the cups 1.

The charge-determining cups 1 illustrated are constructed the same and operate in the same manner as referred to and described in my copending application Serial No. 80,246, filed herewith.

The lubricant pump which I have illustrated in Figs. 1 and 2 comprises a lubricant cylinder 9, a second cylinder 10 and pistons 11 and 12 for operation in each cylinder. Both cylinders are aligned and connected and the pistons are connected to each other by a rod 13 so that movement of one piston produces like movement of the other. The cross-sectional area of the piston 11 is substantially smaller than the cross-sectional area of the piston 12 so that the lubricant may be forced from the cylinder 9 at a substantial increase in pressure over the force applied to the piston 12.

The piston 12 may be operated by any suitable means, but I prefer to move it in one direction by hand and in the opposite direction by providing a vacuum at one side of the piston while atmospheric pressure is admitted to the opposite side. The piston 12 is therefore provided with two cup leathers facing in opposite directions to prevent leakage from one side thereof to the other.

At the front end of the cylinder, I provide an elbow 14, or other suitable part, to which is secured a conduit 14$^a$ connecting a passage in the elbow, which leads into the cylinder, with any suitable device for creating a suction to exhaust the air from the cylinder in front of the piston 12.

To move the piston 12 toward the rear end of the cylinder 10, I have provided a handle 15 at the dash of the vehicle, the handle being connected to the piston 12 by a rod 16 which passes through the rear of the cylinder, as best illustrated in Fig. 1. Instead of being connected directly to the piston 12, the rod passes into a chamber 17, presented by parts 18 and 19 secured to the piston, and at its inner end presents a valve 20 for cooperation with a seat 21 presented by the part 18. The valve is normally held against its seat by a spring 22 surrounding the rod 16 in the chamber 17. At the forward side of the piston, I provide, in the part 18, a passage 23 which communicates with a passage leading through the center of the valve seat to the chamber 17, and at the rear side of the piston 12 I provide a vent 24 in the part 19, the purposes of the passages and valve being more fully hereinafter described.

The piston 11 may have a single cup washer or two cup washers facing in opposite directions, depending upon whether or not the piston draws the lubricant into the cylinder from the source of supply or whether the lubricant is forced to the cylinder by the gear pump of the vehicle or other suitable means. In this instance, I have shown two cup leathers secured together so as to face in opposite directions because the piston is used to draw the lubricant from the crankcase 25 of the motor of the vehicle, as shown in Fig. 1. The lubricant in the crankcase is connected with the pipe system 2 through a conduit 26 and a suitable check valve 27 is provided to prevent flow of lubricant into the system except when desired and also to prevent return of lubricant from the system to the crankcase.

Assuming that the parts of the system are in the position shown in Figs. 1 and 3 and suction is present in the conduit 14, the system is ready for operation. The only act required of the operator to lubricate all of the parts of the vehicle to which the system is connected is to pull on the handle 15 to move the pistons 11 and 12 to the rear ends of their respective cylinders. As the handle 15 is pulled, the valve 20 is unseated (Fig. 2), thereby permitting passage of air from the rear side of the piston 12 through the vent 17, chamber 15, past the valve seat 21 and through the passage 23 to the other side of the piston. Air is admitted to both sides of the piston 12 during the back stroke of the piston to make it easy to move the piston in its cylinder. As soon as the piston moves away from the end of the elbow 14, suction is immediately admitted to the cylinder 10 at the forward side of the piston. As the piston 11 moves toward the rear end of its cylinder 9, lubricant is either forced into the chamber in the cylinder or it is drawn by suction into and fills the cylinder 9. In this instance, the lubricant is drawn into the cylinder from the crankcase 25. Air may be admitted to the cylinder at the rear side of the piston 11 during the forward and backward strokes of the piston, through the vent 28.

When the pistons have been moved rearwardly as far as possible, the operator need merely release his hold on the handle 15 and the pistons will immediately be forced forward to force lubricant to the cups 1. As the operator releases the handle 15, the spring 22 closes the valve 20 and prevents further passage of air from one side of the piston 12 to the other. Then the suction admitted to the cylinder 10 through the conduit 14ᵃ operates to form a partial vacuum at the forward side of the piston 12. At the same time, atmospheric pressure is admitted to the rear side of the piston through the opening 29 in the rear head of the cylinder 10. The combination of the partial vacuum and the atmospheric pressure forces the piston 12 forward, thereby forcing the piston 11 forward in its cylinder to expel the lubricant from the cylinder 9 to the cups 1 through the pipe system 2. During this operation lubricant is prevented from returning to the crankcase by the ball check 27.

As the lubricant enters the cups 1, it fills the charge-determining reservoirs therein, then operates the lubricant discharging means 30 therein to force the lubricant to the bearings in substantially the same manner as illustrated and described in the above-mentioned copending application.

The quantity of lubricant which the cylinder 9 holds is greater than the quantity of lubricant required to fill and operate the number of cups 1 used in the system. Therefore the pistons 11 and 12 will move only far enough to fill and operate the cups while suction is continued in the cylinder 10. But when the suction is stopped, as by stopping the motor of the vehicle, the pressure in the pipe system 2 and in the cylinder 9 will cease and the springs 31 in the cups may then force the discharging means in the cups to their normal positions, as shown in Fig. 3. Then when the motor starts again and suction is created, the pistons will be moved to their extreme forward positions, as shown in Fig. 1, the piston 12 closing the passage in the elbow 14 to cut off the suction from the cylinder 10, as illustrated.

From the above description, it will be readily seen that I have provided a simple and inexpensive central lubricating system with a pump which can not continue in operation, after completing its lubricant discharging strokes, until again set in motion by the operator. Thus, if a pipe of the pipe system 2 becomes broken without knowledge of the operator, no damage can occur to the motor by draining the crankcase as might easily happen if a continuously operative pump were used to draw the lubricant from the crankcase. The amount of lubricant which the pump, illustrated, would draw from the crankcase for one operation of the system would not affect the operation of the motor.

The two-way valve part 32 shown in the pipe line 2 between the cylinder 9 and the crankcase 25 is optional and may be eliminated if desired. It merely provides a valve 33 which may be unseated by the lubricant when being drawn into the cylinder 9, as shown in Fig. 4, and a second ball valve 34 openable by the pressure of the lubricant when being forced to the cups 1. This valve part is substantially the same as that shown and described in my co-pending application Serial No. 80,246, filed herewith.

While I have shown and described a preferred embodiment of my invention, it will be understood that changes involving omission, substitution, alteration and reversal of parts, and even changes in the mode of operation, may be made without departing from the scope of my invention, which is best defined in the following claims.

Claims:

1. A central lubricating system including a plurality of lubricant cups for supplying lubricant to parts to be lubricated, a lubricant pump for forcing lubricant to said cups, a pipe system for conveying the lubricant from said pump to said cups, and a conduit connecting the pipe system with a source of lubricant supply, said pump comprising a lubricant cylinder, a combined inlet and outlet passage connecting said cylinder with the pipe system to permit passage of lubricant into and out of said cylinder, a piston reciprocable in said cylinder to draw lubricant into said cylinder from the source of supply and to force the lubricant from said cylinder through said pipe system to said cups and other piston means operable in a second cylinder to reciprocate said first mentioned piston.

2. A central lubricating system including a plurality of lubricant cups for supplying lubricant to parts to be lubricated, a lubricant pump for forcing lubricant to said cups, a pipe system for conveying the lubricant from said pump to said cups, and a conduit connecting the pipe system with a source of lubricant supply, said pump comprising a lubricant cylinder, a combined inlet and outlet passage connecting said cylinder with the pipe system to permit passage of lubricant into and out of said cylinder, a piston reciprocable in said cylinder to draw lubricant into said cylinder from the source of supply and to force the lubricant from said cylinder through said pipe system to said cups, a second cylinder aligned with said first mentioned cylinder, and a piston in said second cylinder connected to said first mentioned piston, said second piston manually operable in one direction and operable in the opposite direction by partial vacuum created at one side of the piston in said cylinder while atmospheric pressure is admitted to the other side of said piston thereby to operate said first mentioned piston in its cylinder.

3. A central lubricating system including a plurality of lubricant cups for supplying lubricant to parts to be lubricated, a lubricant pump for forcing lubricant to said cups, a pipe system for conveying the lubricant from said pump to said cups, and a conduit connecting the pipe system with a source of lubricant supply, said pump comprising a lubricant cylinder, a combined inlet and outlet passage connecting said cylinder with the pipe system to permit passage of lubricant into and out of said cylinder, a piston reciprocable in said cylinder to draw lubricant into said cylinder from the source of supply and to force the lubricant from said cylinder through said pipe system to said cups, suction-operated piston means connected to said first-mentioned piston for operating said piston in its cylinder.

4. A central lubricating system including a plurality of lubricating cups for supplying lubricant to parts to be lubricated, a lubricant pump for forcing lubricant to said cups, a pipe system for conveying the lubricant from said pump to said cups, and a conduit connecting the pipe system with a source of lubricant supply, said pump comprising a lubricant cylinder, a combined inlet and outlet passage connecting said cylinder with the pipe system to permit passage of lubricant into and out of said cylinder, a piston reciprocable in said cylinder to draw lubricant into said cylinder from the source of supply and to force the lubricant from said cylinder through said pipe system to said cups, combined vacuum and hand operative piston means cooperating with said piston for operation thereof to draw lubricant into said cylinder and expel it therefrom under pressure.

5. In a central lubricating system of the class described, a lubricant pump for forcing lubricant to a plurality of lubricant cups, said pump comprising a lubricant cylinder, a piston reciprocable in said cylinder, a second cylinder aligned with said first cylinder and a piston in said second cylinder connected to said first piston so that operation of one cylinder operates the other, a passage leading into said second cylinder at one end thereof through which air in said cylinder may be exhausted at one side of the piston to provide a partial vacuum while atmospheric pressure is admitted at the other side to force the piston in one direction in said cylinder and a rod connected to said second piston and presenting a handle by which said piston may be moved in the opposite direction.

6. In a central lubricating system of the class described, a lubricant pump for forcing lubricant to a plurality of lubricant cups, said pump comprising a lubricant cylinder, a piston reciprocable in said cylinder, a second cylinder aligned with said first cylinder and a piston in said second cylinder connected to said first piston so that operation of one piston operates the other, a passage leading into said second cylinder at one end thereof through which air in said cylinder may be exhausted at one side of the piston to provide a partial vacuum while atmospheric pressure is admitted at the other side to force the piston in one direction in said cylinder and a rod connected to said second piston and presenting a handle by which said piston may be moved in the opposite direction, and valve means openable when said piston is moved in the last mentioned direction, thereby to admit atmosphere from one side of the piston to the other during the manually operated stroke of said piston.

7. In a central lubricating system of the class described, a lubricant pump for forcing lubricant to a plurality of lubricant cups, said pump comprising a lubricant cylinder, a piston reciprocable in said cylinder, a second cylinder aligned with said first cylinder and a piston in said second cylinder connected to said first piston so that operation of one cylinder operates the other, a passage leading into said second cylinder at one end thereof through which air in said cylinder may be exhausted at one side of the piston to provide a partial vacuum while atmospheric pressure is admitted at the other side to force the piston in one direction in said cylinder and a rod connected to said second piston and passing through the end of said cylinder to present a handle by which said rod may be pulled to move said pistons in one direction in their cylinders and a valve carried by the inner end of said rod and normally seated in a part carried by said second mentioned piston to close a passage from one side of the piston to the other, said valve adapted to be unseated to permit passage of atmosphere from one side of the piston to the other when the handle on said rod is pulled.

8. A central lubricating system including a plurality of charge-determining lubricant cups for supplying predetermined quantities of lubricant to parts to be lubricated, a lubricant pump for forcing lubricant to said cups, a pipe system for conveying the lubricant from said lubricant pump to said charge-determining cups, a source of lubricant supply adapted to be put in communication with said pump, said pump including a lubricant cylinder, a piston reciprocable in said cylinder to draw lubricant into said cylinder from the source of supply and to force the lubricant from said cylinder through said pipe system to said cups, a second cylinder aligned with said first mentioned cylinder, and a piston in said second cylinder connected to said first mentioned piston, said second piston being manually operable in one direction and operable in the opposite direction by partial vacuum created at one side of the piston in said cylinder while atmospheric pressure is admitted to the other side of said piston thereby to operate said first mentioned piston in its cylinder.

In testimony whereof, I have signed my name to this specification.

HOWARD J. MURPHY.